3,036,117
PREPARATION OF ESTERS OF AROMATIC ACIDS
Merrell R. Fenske, University Park, Pa., assignor to Esso Research and Engineering Company, a corporation of Delaware
No Drawing. Filed Mar. 29, 1960, Ser. No. 18,232
9 Claims. (Cl. 260—475)

The present invention relates to the preparation of alkyl esters of aromatic carboxylic acids. More particularly it relates to a process for making dimethylterephthalate by oxidizing p-xylene in liquid phase with a gas containing molecular oxygen in the presence of a methyl ester of a carboxylic acid and in the presence of an oxidation catalyst.

Dimethylterephthalate is becoming increasingly important as an intermediate in the preparation of high molecular weight resins. Thus, film-forming and fiber-forming polyesters can be prepared by reacting dimethylterephthalate with ethylene glycol in an otherwise known manner.

Various processes have been known heretofore for making aromatic esters such as dimethylterephthalate by oxidation of p-xylene employing either nitric acid or air. One of the more promising processes involves the oxidation of p-xylene with air in the presence of methanol at elevated temperature and pressure whereby substantial amounts of dimethylterephthalate are produced directly in the oxidation stage, without requiring a separate esterification stage. However, among the drawbacks of this process are the relatively high rate at which methanol is oxidized and the relatively narrow range of reaction conditions at which this process can be efficiently operated.

It is an object of the present invention to provide an improved process for making an ester such as dimethylterephthalate by oxidizing an alkyl aromatic hydrocarbon, particularly p-xylene, and a reagent other than methanol. Another object is to provide such a process allowing satisfactory oxidation and esterification in a single stage under a wider variety of reaction conditions than heretofore possible. Still other objects and advantages of the present invention, as well as ways of operating it, will become apparent from the following description.

According to the present invention, good yields of dimethylterephthalate can be obtained by oxidizing a mixture of p-xylene and a methyl ester of a carboxylic acid in liquid phase with air and in the presence of an oxidation catalyst. Oxidation temperatures may range between about 150° and 300° C., preferably between 180° C. and 250° C., and pressures sufficient to maintain in the liquid phase of the reaction mixture a methyl ester concentration of preferably at least about 2.5 mole percent equivalents based on p-xylene, i.e. at least about 1.25 mole percent equivalents per alkyl group of the alkyl benzene being oxidized. Suitable pressures are in the range between about 600 and 800 p.s.i.g. in the case of relatively low boiling esters such as methyl formate or methyl acetate. However, pressures as low as atmospheric or 50 p.s.i.g. may be used where relatively high boiling methyl esters are used. Where suitable pressure equipment is available, the use of low boiling esters such as methyl formate or methyl acetate is preferred. However, methyl esters of other fatty acids containing from 1 to about 4 carbon atoms per acid molecule, e.g. esters of propionic or butyric acids are also suitable. Moreover, esters of dibasic acids of the oxalic acid series having the formula $(CH_2)_n \cdot (COOH)_2$ wherein $n$ may range from 0 to 3 or more are also suitable. Suitable esters accordingly include dimethyl oxalate, dimethyl malonate, dimethyl succinate, dimethyl glutarate, etc. Moreover, methyl esters of perfluorinated or perchlorofluorinated acids of the aforementioned kinds may also be used, e.g. methyl perfluoroacetate, methyl perfluorobutyrate, dimethyl perfluoroglutarate, or methyl esters of perhalogenated acids wherein a part of the hydrogens is substituted by fluorine atoms and another part by chlorine atoms, e.g. 3,5,6-trichloroperfluorohexanoic acid and 3,5,6,8-tetrachloroperfluorooctanoic acid. While fully esterified acids are preferred, the presence of a part of the acids in free form is not particularly objectionable, and in the case of the perhalogenated acids may actually be beneficial since they serve as catalysts or as catalyst promoters in the oxidation step. While methyl esters are preferred, ethyl, propyl or butyl esters can be employed similarly.

Oxidation catalysts useful in the present invention include those oxidation catalysts conventionally used in the oxidation of alkylbenzenes. Accordingly, oxides, hydroxides and inorganic or organic acid salts of cobalt, manganese, lead, chromium, iron, cerium and vanadium may be used. Among the organic acid salts of these metals, naphthenates, terephthalates, toluates and stearates are particularly preferred because of their ready solubility in the reaction mixture. The amount of catalyst used is not critical, but it is essential that the catalyst becomes dissolved in the reaction mixture in a concentration of at least one part per million. In the case of certain aromatic hydrocarbons, especially ortho-dialkylated ones such as ortho xylene, the addition of an oxidation initiator such as benzoyl peroxide or other peroxide or hydrogen bromide, facilitates the desired oxidation reaction.

Air is the preferred oxidizing gas but pure oxygen or mixtures of oxygen with inert gases such as nitrogen or carbon dioxide are also useful. It is desirable to supply air or oxygen-containing gas to the reaction at such a rate that a substantial proportion of its oxygen content is consumed while passing through the liquid reaction mixture. In this manner explosion hazards are eliminated. Accordingly, the oxidant is desirably supplied at a rate of about 0.05 to 2 moles of free oxygen per mole of alkyl benzene feed per hour. The theoretical amount of oxygen required to oxidize one mole of p-xylene to terephthalic acid is three moles.

In operating the invention on a continuous basis p-xylene and the appropriate ester such as methyl acetate are introduced into the lower portion of the reaction zone where the liquid mixture is maintained at a suitable temperature and pressure, e.g. 230° C. and a pressure of about 700 p.s.i.g. The addition of the aliphatic acid ester to the reaction mixture is preferably begun only after oxidation of the alkyl aromatic hydrocarbon has gotten underway. The concentration of the aliphatic acid ester in the liquid reaction mixture is desirably maintained at a level between about 2.5 and 15 mole percent equivalents, e.g. 3 mole percent of methyl acetate or 1.5 mole percent of dimethyl oxalate, based on the dialkyl benzene feed. Concentrations between about 5 and 10 mole percent equivalents of aliphatic acid ester based on the oxidizable alkyl aromatic feed are usually preferred. Excessive concentrations of the aliphatic ester, as well as excessive concentrations of the aromatic ester product, e.g. concentration of more than about 50% of dimethylterephthalate in the reaction mixture, tend to inhibit the oxidation. The water produced in the oxidation is also preferably kept at a concentration below 5 or 10% by continuous or periodic removal.

An oxidation catalyst such as cobalt naphthenate is also added, and air is passed through the reaction mixture. The concentration of catalyst may range between about 0.001 and 5 percent, preferably 0.01 to 0.2 percent (expressed as weight of heavy metal on the total weight of the liquid reaction mixture). Average residence time of the liquid mixture in the reaction zone may be about 0.1 to 5 hours. By proper regulation of the organic liquid and air feed rates, the temperature in the reaction zone can be maintained at the desired level. To further minimize the explosion hazard in the reactor and subsequent piping, condensers, etc., a separate stream of inert gas such as carbon dioxide, nitrogen or preferably steam can be advantageously introduced directly into the vapor space of the reactor above the reacting liquid as air or oxygen is introduced at a high rate into and through the reacting liquid. For instance, 0.5 to 4 volumes of inert gas may thus be supplied to the system per volume of air so as to preclude the formation of an explosive gas mixture in the system while maintaining a high rate of oxidation in the liquid phase.

The oxidized liquid reaction mixture can be continuously withdrawn from the reaction vessel and subjected to appropriate separation steps, e.g. distillation to separate unconverted reagents from the crude dimethylterephthalate. The latter may be purified by recrystallization in methanol, and after separating any large excess of the methanol solvent the residual incompletely oxidized liquor may be recycled to the oxidation. Since this residual liquor will normally contain appreciable amounts of free carboxylic acid corresponding to the ester originally introduced into the oxidation zone, it will be desirable to esterify all or at least a large proportion of this free acid with an alcohol such as methanol before returning the residual liquor to the reaction zone. This esterification of the aliphatic acid may be accomplished by adding methanol to the oxidized reaction mixture after its withdrawal from the oxidation vessel but while the mixture is still substantially at elevated temperature and pressure, e.g. 150° C. and 100 p.s.i.g. In this manner a large portion of the required methyl esters can be advantageously regenerated in the process without addition of any special esterification catalyst and supplied to the main reaction step. Alternately, the esterification of the free acid present in the crude oxidation product can be carried out by conventional procedures after separation of the dimethylterephthalate therefrom.

The vapor phase oxidation products are withdrawn separately from the reaction vessel and cooled to condense water therefrom. The water is then purged from the system, preferably after distilling from it any unconverted reagents such as unconverted methyl ester and free fatty acid. The latter can be reesterified with methanol as described earlier herein. The thus recovered methyl ester of the fatty acid can likewise be returned to the main reaction vessel. However, it is not necessary for the free acid to be completely esterified before return to the reaction as the presence of some free acid can be advantageous, particularly in the case of a perfluoroacid. Without intending to be bound by any particularly theory, it can be speculated that a peroxidized perfluoroacid, such as $C_3F_7COOOH$ in the case where perfluorobutyric acid is used, may be the reactive intermediate which catalyzes or carries out the reaction.

The following examples will further illustrate the operation and advantages of the invention.

EXAMPLE 1

Charge 1110 grams of p-xylene containing 0.6 gram cobalt (as cobalt naphthenate) to an autoclave fitted with a liquid feed line, a condenser and a separator leading to a pressure regulating vent for release of non-condensed gases. The autoclave also should preferably have a draw-off line allowing periodic or continuous removal of liquid product mixture. Pressurize the autoclave to a pressure of 700 p.s.i.g. by means of an equimolar mixture of air and steam and heat to about 220–245° C. Pass air through the xylene at the rate of about 45 liters per minute (about 2 moles of oxygen/mole of xylene/hour). When the exhaust gases indicate that substantial oxidation of the xylene has begun, add methyl acetate vapors simultaneously with the air feed and continue the addition for approximately 2–4 hours at a feed rate of 60 grams of acetate per minute for a total of about 4500–9000 grams of methyl acetate while maintaining the reaction temperature within the aforesaid range. The reaction product will comprise dimethylterephthalate (DMT), methyl hydrogen terephthalate (MHTP), terephthalic acid (TPA), methyl p-toluate (MT), and p-toluic acid (TA). Under proper conditions terephthalic acid and its esters may amount to 40% or more of the product mixture. With recycle of unreacted and partially reacted material, and removal of water from the recycle, the yields of terephthalic acid and its esters can approach 90%.

It is known that carrying out the oxidation of p-xylene alone under similar conditions, i.e. in the absence of methyl acetate, less than 25% of the product comprises terephthalic acid and esters.

Similarly, when such oxidations of p-xylene are carried out with the addition of acetic acid instead of methyl acetate, again only small yields of terephthalic acid and no alkyl terephthalate are obtained.

Other reaction systems to which the present invention can be applied, and reaction conditions appropriate thereto, are summarized in Table I.

Table I

| Example No. | Hydrocarbon | Co-reagent | Temperature, ° C. | Pressure, P.s.i.g. |
|---|---|---|---|---|
| 2 | p-xylene | methyl acetate | 230 | 750 |
| 3 | do | do | 180 | 400 |
| 4 | do | methyl formate | 200 | 600 |
| 5 | do | propyl acetate | 245 | 600 |
| 6 | do | methyl propionate | 250 | 600 |
| 7 | do | ethyl propionate | 240 | 450 |
| 8 | do | methyl acetate | 160 | 150 |
| 9 | do | dimethyl oxalate | 200 | 100 |
| 10 | do | dimethyl perfluoroglutarate | 200 | 250 |
| 11 | do | methyl perfluoroacetate | 180 | 600 |
| 12 | toluene | methyl acetate | 235–255 | 450 |
| 13 | durene | do | 275 | 700 |

EXAMPLE 14

Charge 200 grams of p-xylene containing 1 gram of cobalt naphthenate to the apparatus described in Example 1. Heat the charge to its boiling point (about 130° C.) at atmospheric pressure and pass a stream of air through the liquid at a rate of about 30 liters per hour. When oxidation of the hydrocarbon has begun, add 800 grams of dimethylperfluoroglutarate and 100 grams of the free perfluoroglutaric acid. After about 50 hours during which time the boiling point of the reaction mixture may rise 5–6° C., stop the reaction and work up the product. The reaction mixture will comprise dimethylterephthalate, terephthalic acid, p-toluic acid and its methyl ester. By removing and working up portions of the reaction mixture periodically and separating water from the incompletely oxidized product before recycling the latter to the reaction, essentially all of the xylene can be made to react.

EXAMPLE 15

Repeat Example 14 but raise the temperature of the above reaction mixture to about 230° C. by pressurizing the system with air. Under such conditions the reaction will occur more rapidly.

EXAMPLE 16

Charge 200 grams of p-xylene containing 5 grams of manganese naphthenate to the apparatus of Example 1. Pressurize mixture with air to maintain the liquid reactants in the liquid state and heat to a temperature of 200° C. while passing a stream of air through the liquid at a rate of 50 liters per hour. When the oxidation is underway, inject 500 grams of methylperfluorobutyrate and 10 grams of the free perfluorobutyric acid into the reactor through a pressure line. After continuing the reaction for 5 to 10 hours recover dimethylterephthalate, terephthalic acid, p-toluic acid and its methyl ester from the oxidation product. If desired, withdraw and work up portions of the product periodically or continuously during the course of the reaction and recycle the toluic acid and its ester to the oxidation.

EXAMPLE 17

Charge 200 grams of p-xylene containing 3 grams of cobalt naphthenate to the apparatus of Example 1. Pressure the reaction mixture with air to maintain the reactants in the liquid state and heat to about 225° C. while passing a stream of air through at a rate of 50 to 60 liters per hour. When the oxidation of the xylene is underway, inject 400 grams of dimethyloxalate together with 10 grams of perfluoroglutaric acid into the reactor. Continue the reaction for about 10 hours, periodically withdrawing the product and separating it into its main components, namely dimethylterephthalate, terephthalic acid, p-toluic acid and its methyl ester, free oxalic acid, and water. Discard the water and recycle the toluic acid and its ester to the oxidation reactor. Reesterify the recovered oxalic acid with methanol in a separate vessel, using a small amount of sulfuric acid as an esterification catalyst and recycle the oxalate ester to the oxidation.

In the absence of indications to the contrary, it will be understood that all percentages and proportions of materials are expressed throughout on a weight basis.

Having described the general nature and advantages of the invention and illustrated it by specific examples, its scope is particularly pointed out in the appended claims.

The claimed invention is:

1. A process for the preparation of dimethylterephthalate which comprises contacting a gas containing molecular oxygen with a liquid mixture comprising p-xylene and a methyl ester of an aliphatic carboxylic acid having 1 to 4 carbon atoms in a reaction zone thereby forming dimethylterephthalate, maintaining the reaction zone at a temperature between about 150° and 300° C. and under sufficient pressure to maintain about 2.5 to 15 mole percent equivalents of said methyl ester based on the xylene in the liquid mixture, withdrawing the liquid mixture containing dimethylterephthalate and free acid as well as a gaseous mixture containing said aliphatic carboxylic acid from the reaction zone, separating the dimethyl terephthalate from the withdrawn liquid mixture, separating the aliphatic carboxylic acid from the gaseous mixture, at least partially esterifying the separated aliphatic carboxylic acid and the free acid in the withdrawn liquid mixture with methanol and passing them to the reaction zone.

2. A process for the preparation of dimethylterephthalate which comprises contacting a gas containing molecular oxygen with a liquid mixture comprising p-xylene and a methyl ester of a lower aliphatic carboxylic acid in a reaction zone thereby forming dimethylterephthalate, maintaining the reaction zone at a temperature between about 150° and 300° C. and a pressure sufficient to maintain about 2.5 to 15 mole percent equivalents of the said methyl ester based on the xylene in the liquid phase, withdrawing the oxidized liquid mixture from the reaction zone and separating the dimethyl terephthalate from the oxidized liquid mixture.

3. A process according to claim 2 wherein the ester is a methyl ester of perhalogenated carboxylic acid having from 2 to 5 carbon atoms per molecule.

4. A process according to claim 2 wherein the ester is a methyl ester of an aliphatic carboxylic acid consisting only of carbon, hydrogen and oxygen atoms and containing from 1 to 5 carbon atoms per molecule.

5. A process according to claim 2 wherein the ester is a methyl ester of perfluorocarboxylic acid having from 2 to 5 carbon atoms per molecule and a small amount of said perfluorocarboxylic acid is introduced into the reaction zone as free acid.

6. A process according to claim 2 wherein the ester is methyl formate.

7. A process according to claim 2 wherein the ester is methyl acetate.

8. A process according to claim 2 wherein the ester is dimethyl oxalate.

9. A process according to claim 2 wherein the free carboxylic acid in the residual oxidized liquid after the dimethylterephthalate has been separated therefrom is esterified with methanol, and the resulting esterified liquid substantially free of methanol is recycled to the reaction zone.

References Cited in the file of this patent

UNITED STATES PATENTS

| | | |
|---|---|---|
| 2,772,305 | Levine et al. | Nov. 27, 1956 |
| 2,879,289 | Johnson | Mar. 24, 1959 |
| 2,894,978 | Katzschmann | July 14, 1959 |